(12) United States Patent
Bono et al.

(10) Patent No.: US 10,037,251 B1
(45) Date of Patent: Jul. 31, 2018

(54) FILE SYSTEM ROLLBACK TO PREVIOUS POINT IN TIME

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 347 days.

(21) Appl. No.: 14/674,556

(22) Filed: Mar. 31, 2015

(51) Int. Cl.
*G06F 17/30* (2006.01)
*G06F 11/14* (2006.01)

(52) U.S. Cl.
CPC .... *G06F 11/1469* (2013.01); *G06F 17/30174* (2013.01); *G06F 2201/84* (2013.01); *G06F 2201/87* (2013.01)

(58) Field of Classification Search
CPC ............. G06F 11/1469; G06F 11/1446; G06F 11/1471; G06F 17/30174; G06F 2201/84; G06F 2201/87
USPC ......................... 707/639, 648, 649, 674, 684
See application file for complete search history.

(56) References Cited

U.S. PATENT DOCUMENTS

| | | | |
|---|---|---|---|
| 7,254,685 B1 | 8/2007 | Cardente | |
| 7,631,155 B1 | 12/2009 | Bono et al. | |
| 7,865,677 B1 * | 1/2011 | Duprey | G06F 3/0604 711/162 |
| 8,433,869 B1 | 4/2013 | Natanzon et al. | |
| 8,655,848 B1 * | 2/2014 | Leverett | G06F 17/30088 707/660 |
| 9,305,009 B1 | 4/2016 | Bono et al. | |
| 2004/0030668 A1 | 2/2004 | Pawlowski et al. | |
| 2009/0313503 A1 | 12/2009 | Atluri et al. | |
| 2011/0295804 A1 * | 12/2011 | Erofeev | H04L 29/0854 707/634 |
| 2012/0047392 A1 * | 2/2012 | Akirav | G06F 11/2094 714/3 |
| 2013/0103650 A1 * | 4/2013 | Natanzon | G06F 17/30008 707/684 |
| 2014/0122428 A1 * | 5/2014 | Zhou | G06F 17/30179 707/623 |

OTHER PUBLICATIONS

EMC Corporation, "Configuring Virtual Data Movers on VNX," (http://corpusweb130.emc.com/upd_prod_VNX/UPDFinalPDF/jp/VDMs.pdf) Feb. 2011.
EMC Corporation, "Using EMC Celerra Replicator," Feb. 2009.

(Continued)

*Primary Examiner* — Hares Jami
(74) *Attorney, Agent, or Firm* — BainwoodHuang

(57) ABSTRACT

A technique for performing continuous data protection and point-in-time recovery for file systems includes performing continuous replication to maintain a replica of a file system by writing changes in the file system to a journal and then writing the changes from the journal to the replica. In response to receiving a request to roll back the replica to a previous point in time, the technique accesses the journal to identify changes made to the replica since the previous point in time and performs undo operations to undo the identified changes and restore the replica to its state at the previous point in time.

15 Claims, 10 Drawing Sheets

(56) References Cited

OTHER PUBLICATIONS

EMC Corporation, "EMC Celerra Replicator," (http://chucksblog.emc.com/content/CelerraReplicator.pdf) 2008.
EMC Corporation, "EMC RecoverPoint Family," (http://www.emc.com/collateral/software/data-sheet/h2769-recoverpoint-ds.pdf) Aug. 2013.
EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdt) 2008.
EMC Corporation, "Array-Based Replication with EMC VPLEX," (http://www.emc.com/collateral/hardware/white-papers/h8005-array-based-replication-vplex-wp.pdf) Aug. 2010.

\* cited by examiner

FILE SYSTEM ROLLBACK TO PREVIOUS POINT IN TIME

BACKGROUND

Data storage systems commonly employ continuous data protection (CDP), also known as "continuous replication," for protecting the data they store. Continuous replication operates on storage volumes using Fibre Channel or iSCSI (Internet Small Computer System Interface), for example, to replicate data writes performed on storage volumes at a source to replicas of the storage volumes maintained at a destination. Continuous replication generally allows administrators to perform point-in-time recovery of a volume to a previous state with fine granularity.

A well-known solution for continuous data protection is the RecoverPoint system available from EMC Corporation of Hopkinton, Mass. RecoverPoint systems include a replication splitter and one or more local appliances, both at a source data storage system and at a destination data storage system. As the source processes IO (Input/Output) requests that specify data to be written to a particular volume, the replication splitter at the source intercepts the IO requests and sends them to the local appliance. The appliance at the source communicates with the appliance at the destination, and the two appliances orchestrate the storage of the data specified in the IO requests at the destination. In this manner, the destination is made to store a current, or nearly current, replica of the volume. In addition, journaling of changes made to the replica allow one to achieve point-in-time recovery in the event of a failure at the source or as otherwise desired.

SUMMARY

Although continuous data protection can provide a reliable approach to replicating data and providing point-in-time recovery for storage volumes, it is not an approach that works natively with file systems. Unlike volumes, in which data are addressed using block-based semantics, e.g., by specifying LUNs (logical unit numbers) and offset ranges, data in file systems are generally accessed by specifying directories and file names. In addition, access to data in volumes is generally achieved using Fibre Channel or iSCSI protocols, whereas access to data in file systems is generally achieved using NFS (Network File System), CIFS (Common Internet File System), or SMB (Server Message Block) protocols. Thus, the benefits afforded by continuous data protection are generally not available to file systems.

In contrast with these prior approaches, in which continuous data protection and point-in-time recovery are limited to storage volumes, an improved technique provides continuous data protection and point-in-time recovery for file systems. The technique includes performing continuous replication to maintain a replica of a file system by writing changes in the file system to a journal and then writing the changes from the journal to the replica. In response to receiving a request to roll back the replica to a previous point in time, the improved technique accesses the journal to identify changes made to the replica since the previous point in time and performs undo operations to undo the identified changes and restore the replica to its state at the previous point in time.

In some examples, the replica of the file system is realized as a container file in a container file system in a data storage system. The data storage system includes a mapping layer to expose the container file as a volume. Continuous replication may then operate on the resulting volume-file as it would on any other volume, and thus may perform continuous data protection and point-in-time recovery on the file system.

In some examples, multiple file systems are grouped together in a construct referred to herein as a VSP, or Virtualized Storage Processor, which acts to aggregate multiple file systems under a single object. In some examples, VSPs may include other objects besides file systems, such as LUNs and VVols (virtual volumes), for example. In accordance with embodiments disclosed herein, the improved technique groups together the multiple file systems and/or other objects and performs continuous data protection on those objects as a single unit. The improved technique further enables one to roll back a replica of a VSP, including all of its data objects, consistently to a previous point in time. Thus, in an example, point-in-time recovery is made available for both file systems and VSPs.

In a particular example, recovery of a file system or a VSP to a previous point in time is performed as part of DR (Disaster Recovery) testing. For instance, if a current version of a file system or VSP appears to be corrupted, an administrator can roll back the replica to a previous point in time, e.g., to get behind the corruption. The administrator may then perform DR testing and resume from the previous point in time or from some other point in time.

Certain embodiments are directed to a method of managing file system replicas in a data storage system. The method includes performing continuous replication to maintain a replica of a file system, the continuous replication (i) specifying changes to be made to the file system and mirrored to the replica, (ii) persisting the changes and associated timestamps in a journal, and (iii) applying the changes persisted in the journal to the replica. The method further includes receiving a request to roll back the replica of the file system to a previous point in time and, in response to receiving the request, (i) accessing the journal to identify, based on the timestamps, a set of the changes made to the replica since the previous point in time and (ii) undoing the set of the changes in the replica to restore the replica to the previous point in time.

Other embodiments are directed to a data storage system including control circuitry constructed and arranged to perform a method of managing file system replicas in a data storage system, such as the method described above. Still other embodiments are directed to a computer program product. The computer program product stores instructions which, when executed by control circuitry, cause the control circuitry to perform a method of managing replicas in a data storage system, such as the method described above. The replicas may be replicas of file systems or replicas of VSPs.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique provides continuous data protection and point-in-time recovery for file systems and VSPs (Virtualized Storage Processors). This document is presented in sections to assist the reader. In the material that follows, Section I presents an example environment in which improved techniques hereof can be practiced. Section I describes, inter alia, a unified datapath architecture for expressing both block-based objects and file-based objects as respective underlying volumes and underlying files, which enables the use of a common replication approach for both block-based and file-based objects.

Section II presents particular example improvements for effecting continuous replication of both block-based and file-based objects on a per-user-object basis under the direction of a common replication manager.

Section III presents particular improvements for performing point-in-time recovery of file system and VSP replicas.

Figure 1:
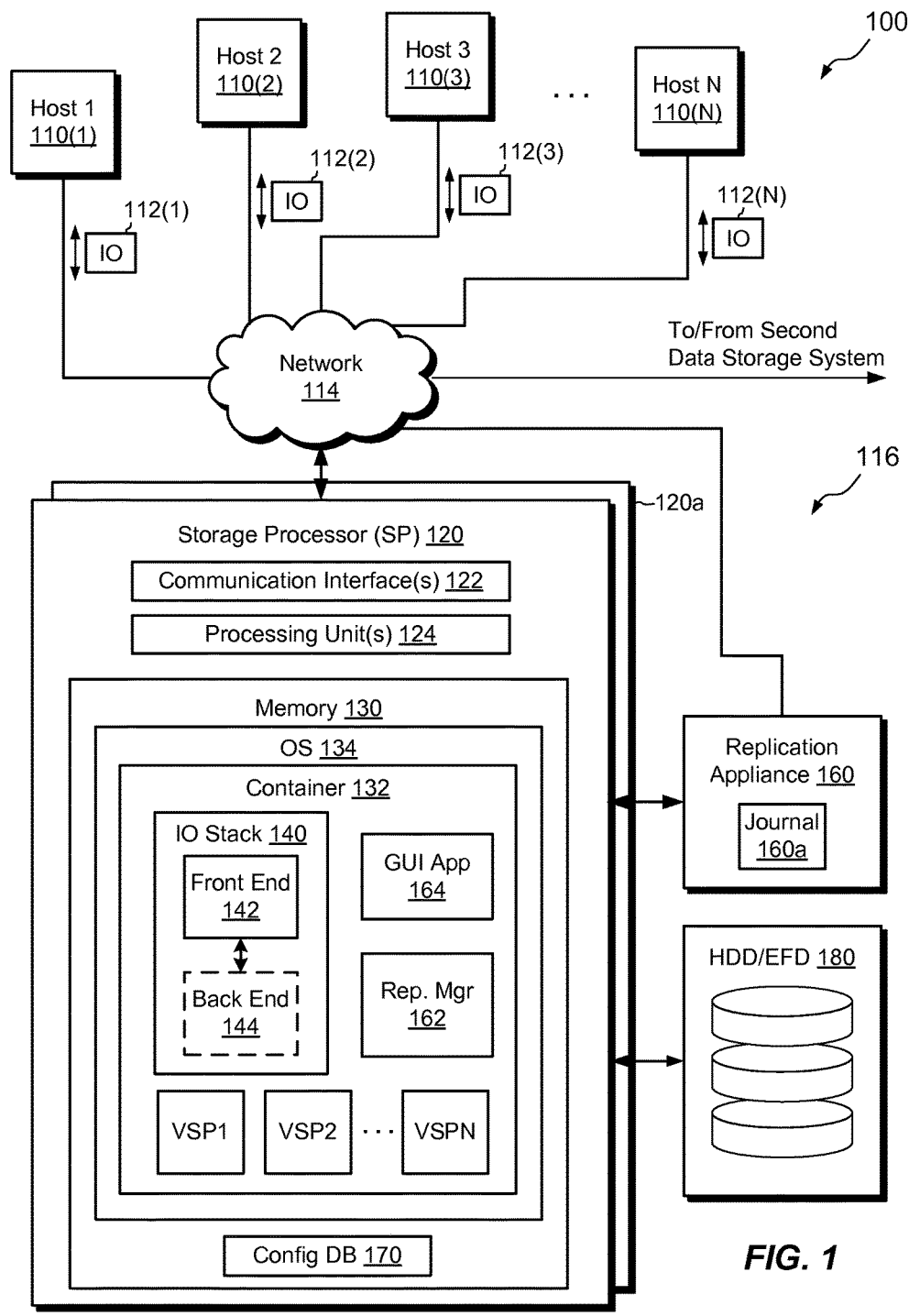
FIG. 1 is a block diagram showing an example environment in which improved techniques hereof can be practiced.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) may connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading and/or writing the storage 180.

The SP 120 is seen to include one or more communication interfaces 122, a set of processing units 124, and memory 130. The communication interfaces 122 include, for example, adapters such as SCSI target adapters and network interface adapters for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, only a single container 132 is shown. Running within the container 132 is an IO stack 140, a replication manager 162, a Graphical User Interface (GUI)-based application 164, and multiple VSPs (Virtualized Storage Processors) VSP1 to VSPN. A VSP is a collection of data objects, internal file systems, and servers (e.g., NFS and/or CIFS servers), which together provide a mechanism for grouping objects and providing a common set of network interfaces such that the VSP appears from outside the SP 120 to be similar to a physical SP. Although certain components are shown residing within the container 132, different components alternatively reside in different containers. For example, the GUI-application 164 may run within a dedicated container and communicate with the replication manager 162 using IPC.

The IO stack 140 provides an execution path for host IOs (e.g., IO requests 112(1-N)) and includes a front end 142 and a back end 144. In alternative arrangements, the back end 144 is located on another SP (e.g., SP 120a) or is provided in a block-based array connected to the SP 120 (e.g., in a gateway configuration).

The replication appliance 160 assists in performing continuous replication to a second data storage system, which may be located locally to the data storage system 116 or remotely. In an example, the replication appliance 160 takes the form of a hardware unit, and multiple such units may be provided, e.g., in a clustered arrangement, such as for supporting strong data compression and other advanced features. For purposes of this document, the replication appliance 160 is referred to as a single component. It should be understood, however, that the replication appliance 160 may be implemented using any number of coordinating units. Continuous replication may also be performed entirely locally, e.g., between a source volume and a destination volume both housed within the data storage system 116. The replication appliance 160 may include a journal 160 for persisting replication data and for performing other functions The replication manager 162 orchestrates replication and coordinates with other data storage systems to conduct and manage replication sessions. Here, the replication manager 162 establishes replication settings on a per-data-object basis, conducts replication sessions with replica sites, and controls replication activities, including recovery, failover, and DR testing activities.

The GUI application 164 provides a user interface for configuring the replication manager 162, e.g., for establishing replication settings on particular data objects. In an example, the GUI application 164 further provides user interface controls for creating data objects, destroying data objects, and managing data objects throughout their lifecycles. Particular functions of the GUI application 164 may include, for example, managing VSPs throughout their lifecycles, accessing replicas of VSPs (e.g., locally or on other data storage systems), rolling back VSP replicas to previous points in time, and performing DR testing. In one implementation, the GUI application 164 is a modified form of the Unisphere integrated management tool, available from EMC Corporation of Hopkinton, Mass.

As the IO stack 140, replication manager 162, and GUI application 164 all run within the same container 132, the IO stack 140, and replication manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive or flash drive separate from the SP 120 but accessible to the SP 120, e.g., over a backplane or network, or in some other location.

In example operation, the hosts 110(1-N) issue IO requests 112(1-N) to the data storage system 116. The IO requests 112(1-N) may include block-based requests and/or file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, available from VMWare Corporation of Palo Alto, Calif.), and other data objects, to block-based requests presented to internal volumes. Processing in the front end 142 may further include mapping the internal volumes to respective files stored in a set of internal file systems of the data storage system 116. Host IO requests 112(1-N) directed to the SP 120 for reading and writing both block-based objects and file-based objects are thus converted to reads and writes of respective volumes, which are then converted to reads and writes of respective files. As will be described, the front end 142 may perform continuous replication at the level of the internal volumes, where both block-based objects and file-based objects are presented in block-based form. Continuous replication may thus be applied to file systems, as well as to other objects. Also, as will become apparent, continuous replication may further be applied to VSPs, e.g., by forming consistency groups among the file systems or other objects that make up the VSPs.

After processing by the front end 142, the IO requests propagate to the back end 144, where the back end 144 executes commands for reading and/or writing the physical storage 180, agnostically to whether the data read and/or written is directed to a block-based object or to a file-based object.

Figure 2:
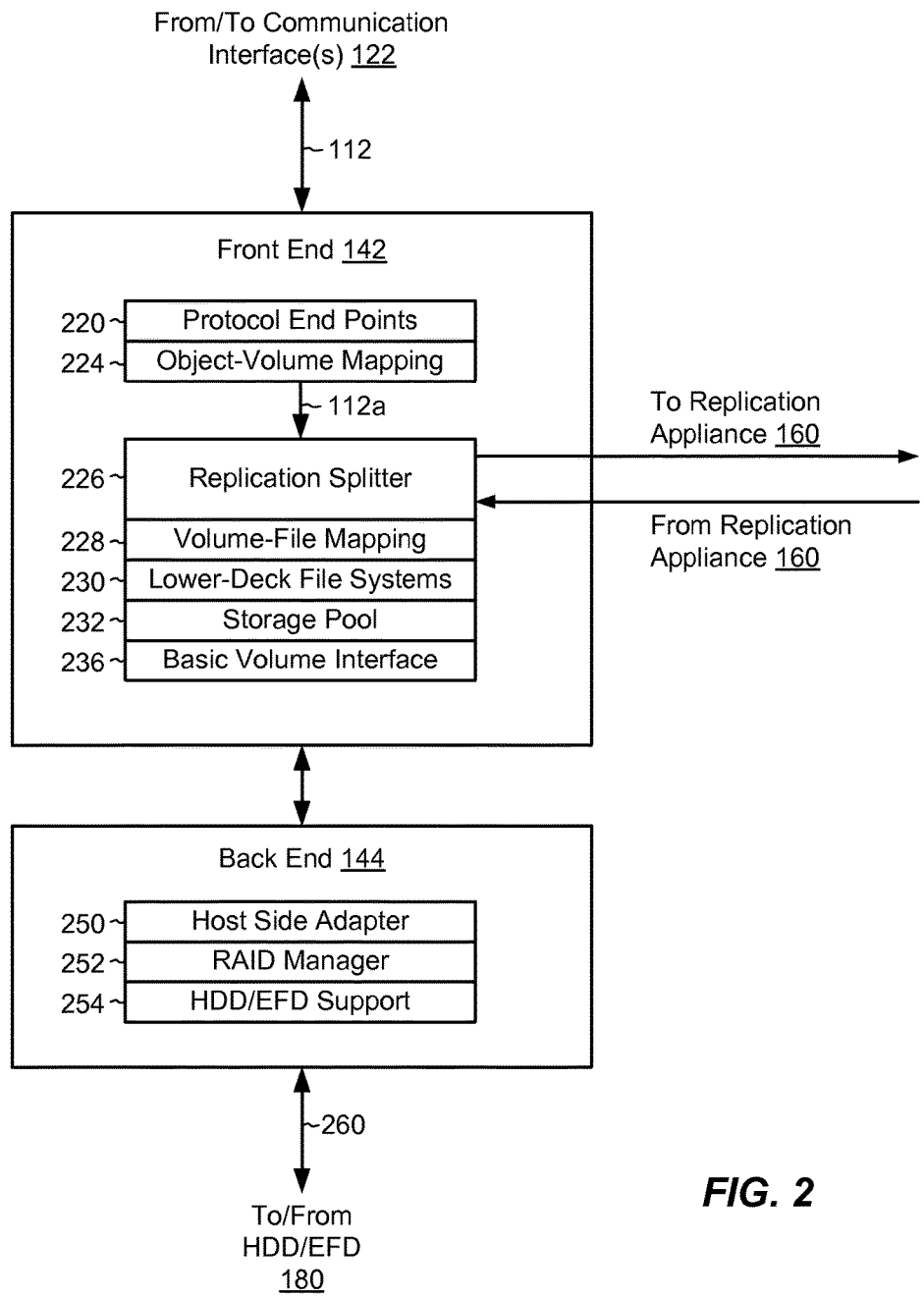
FIG. 2 is a block diagram showing an example IO stack of a storage processor of FIG. 1.

FIG. 2 shows the front end 142 and back end 144 of the IO stack 140 in additional detail. Here, the front end 142 is seen to include protocol end points 220, a redirector 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up. It is understood that IO requests 112 are internal representations of the IO requests 112(1-N) as shown in FIG. 1.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different hardware. The basic volume interface 236 may also be disabled in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, expressing the RAID groups as FLUs (Flare LUNs), and dividing the FLU's into slices.

The lower-deck file systems 230 are built upon slices managed by a storage pool 232 and represent both block-based objects and file-based objects internally in the form of files (e.g., container files). The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself (the primary object) and, in some instances, other files that store snaps of the file that stores the primary object. Some implementations may provide for storage of other files, such as auxiliary files, which support respective primary files. An example of an auxiliary file is a hybrid log, which stores pending metadata transactions directed to a primary object stored as a file in the same lower-deck file system. Each lower-deck file system 230 has an inode table. The inode table provides a different inode for each file stored in the respective lower-deck file system. The inode table may also store properties of the file(s), such as their ownership and block locations at which file data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting locations (logical unit number) and offsets, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication manager 162 on a per-data-object basis to intercept IO requests and to replicate (e.g., mirror) the data specified to be written in such requests according to data-object-specific settings. Depending on the data object to which the IO request is directed and the replication settings defined for that object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication manager 162 can configure the replications splitter 226 in a variety of ways for responding to different types of IO requests 112. For example, replication manager 162 can configure the replication splitter 226 to operate in a pass-through mode for control IOs and for IO requests specifying data reads. In some situations, the replication manager 162 can configure the replication splitter 226 to intercept reads as well as writes. In any such situations, the replication manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may involve a remapping operation from a format compatible with the internal volume to a format compatible with the LUN. In some examples, no remapping is needed. Mapping internal volumes to host file systems, however, may be accomplished by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems and file-based vVOLs) using NFS, CIFS, or SMB 3.0, for example.

In example operation, the IO stack 140 receives an IO request 112 specifying data to be written to a particular data object. The object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112a to continue propagating down the IO stack 140. The volume-file mapping 228 maps the block-based request 112a to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

The replication splitter 226 may operate in both a source mode (described above) and in a destination mode. In destination mode, the replication splitter 226 receives mirrored IO requests arriving from another data storage system via the replication appliance 160. Lower levels of the IO stack 140 then process the mirrored IO requests to effect data writes to a local replica.

Figure 3:
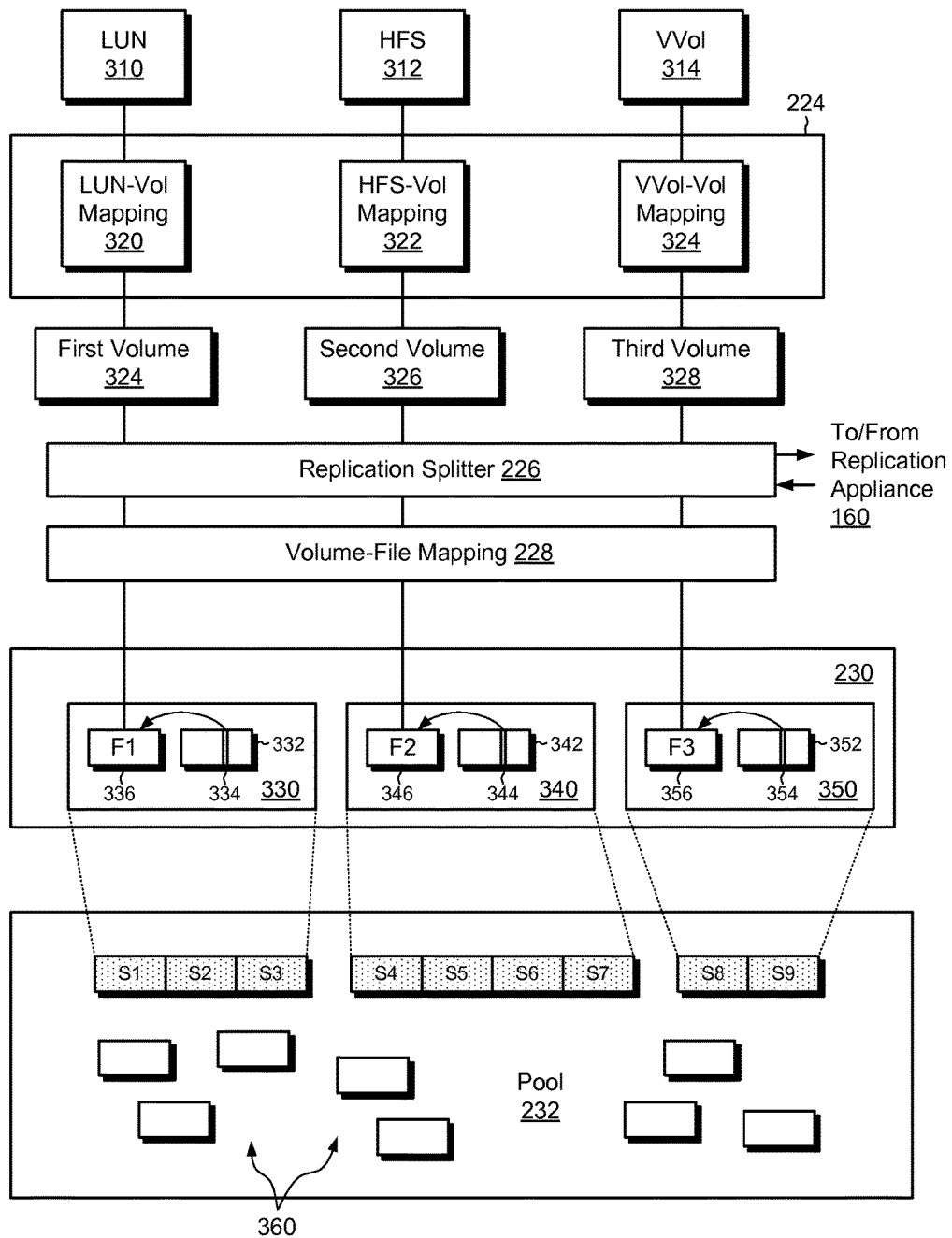
FIG. 3 is a block diagram showing example features of the IO stack of FIG. 2 in additional detail.

FIG. 3 shows portions of the front end 142 in additional detail. Here, data objects include a LUN 310, an HFS (host file system) 312, and a VVol 314. The object-volume mapping 224 includes a LUN-to-Volume mapping 320, an HFS-to-Volume mapping 322, and a VVol-to-Volume mapping 324. Using the approach described above, the LUN-to-Volume mapping 320 maps the LUN 310 to a first volume 324, the HFS-to-Volume mapping 322 maps the HFS 312 to a second volume 326, and the Vvol-to-Volume mapping 324 maps the VVol 314 to a third volume 328. The replication splitter 226 may intercept IOs in accordance with settings established by the replication manager 262 (as described above). The Volume-to-File mapping 228 maps the first, second, and third internal volumes 324, 326, and 328 to respective files 336 (F1), 346 (F2), and 356 (F3) in respective lower-deck files systems 330, 340, and 350. Through the various mappings, any set of blocks of the LUN 310 specified in an IO request 112 is mapped to a corresponding set of blocks within the first volume 324 and within the first file 336. Similarly, any file or directory of the HFS 312 specified in an IO request 112 is mapped to a corresponding set of blocks within the second volume 326 and within the second file 346. Likewise, any portion of the VVol 314 specified in an IO request 112 is mapped to a corresponding set of blocks within the third volume 328 and within the third file 356.

The lower-deck file systems 330, 340, and 350 each include a respective inode table, 332, 342, and 352. Modes 334, 344, and 354 provide file-specific information about the first file 336, the second file, 346, and the third file 356, respectively. The information stored in each inode includes location information (e.g., block locations) where data of the respective file are stored.

Although a single file is shown for each of the lower-deck file systems 330, 340, and 350, it is understood that each of the lower-deck file systems 330, 340, and 350 may include any number of files, with each file having its own entry in the respective inode table. In one example, each lower-deck file system stores not only the file F1, F2, or F3, but also snaps of those files, and therefore snaps of the data objects realized by the files. Lower-deck file systems may also include auxiliary files (not shown), such as hybrid log files, which may accompany upper-deck file systems, such as HFS 312. Although FIG. 3 shows only one host file system (HFS 312), it is understood that any number of host file systems may be provided, and that such host file systems may be grouped together in one or more VSPs.

As shown, the storage pool 232 provisions slices 360 to the file systems 330, 340, and 350. Here, slices S1-S3 provide storage for lower-deck file system 330, slices S4-S7 provide storage for lower-deck file system 340, and slices S8 and S9 provide storage for lower-deck file system 350.

Because the files F1, F2, and F3 each store entire data objects, including their metadata, the data stored in these files may include both non-metadata and metadata. For example, file F2 stores an entire host file system, including its file data (non-metadata) as well as its inodes, indirect blocks, per-block metadata, and so forth.

Figure 4:
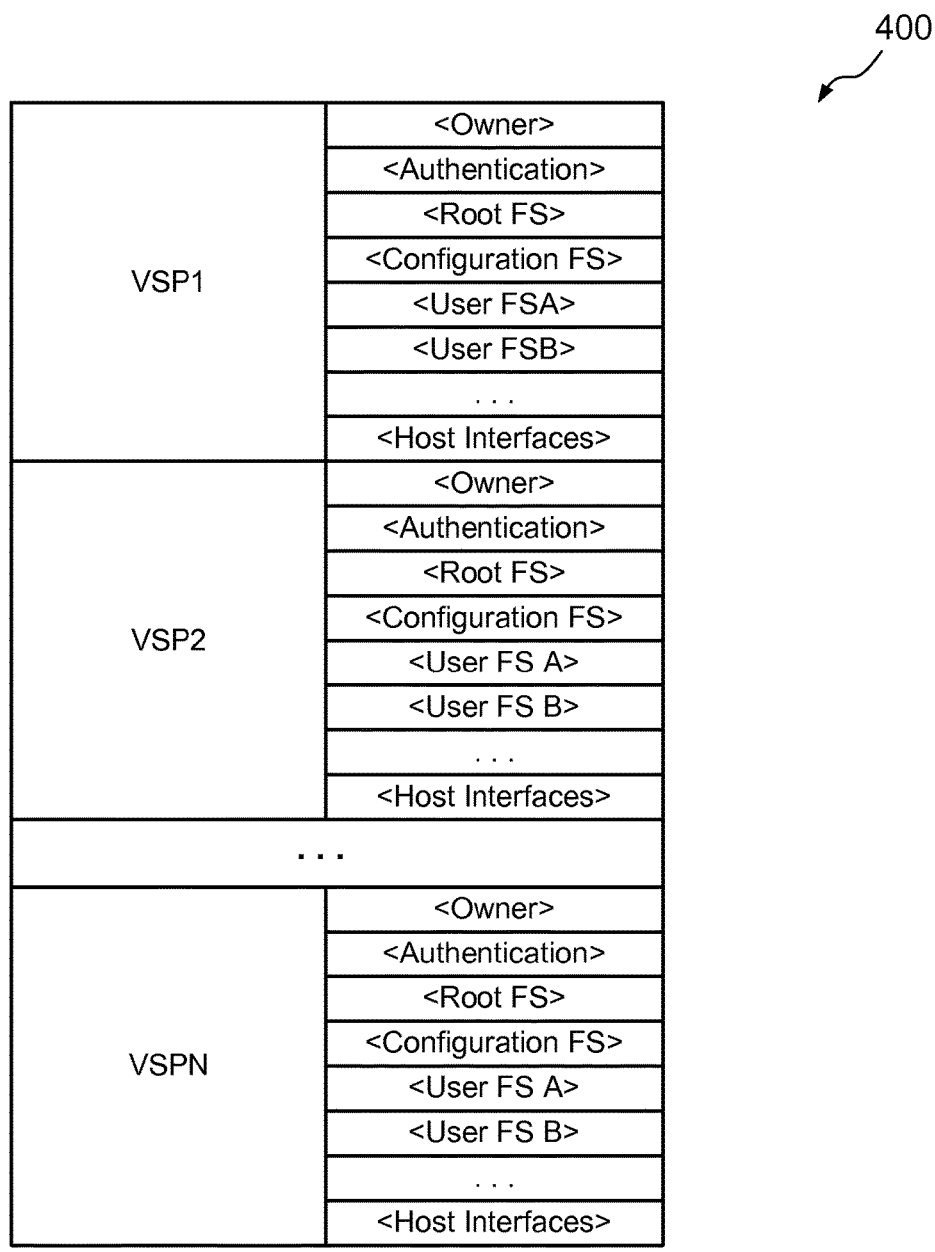
FIG. 4 is a block diagram showing example records of a configuration database that associates VSPs with data objects.

FIG. 4 shows an example set of records 400 of the configuration database 170 (FIG. 1), which provide definitions for VSPs 1-N. For each VSP, a record specifies an owning SP, authentication information, and identifiers of data objects (e.g., file systems, but in some cases also LUNs and/or VVols) associated with the respective VSP, including identifiers of internal file systems (e.g., a root file system and a configuration file system) and various user file systems or other data objects. The record may further specify various host interfaces that define host IO protocols that the respective VSP is equipped to handle. The record for each VSP thus identifies not only data objects associated with the VSP, but also a set of interfaces and settings that form a "personality." This personality enables the VSP to interact with hosts in a manner similar to the way a physical storage processor interacts with hosts. When operated, VSPs are instantiated on the owning SP by starting their respective host interfaces. The interfaces for each VSP can respond to host IO requests for reading and writing the data objects of the respective VSP, which are stored in the storage 180.

II) Continuous Replication on Block-Based and File-Based Objects:

Various arrangements for performing continuous replication will now be described in connection with FIG. 5. As is known, "continuous" replication provides any-point-in-time recovery and may be performed using synchronous or asynchronous replication technologies. "Synchronous" replication refers to replication performed in band with IO requests as the IO requests are processed. In contrast, "asynchronous" replication is performed out of band with individual IO requests, with replicas generated, for example, on demand, at regular intervals, and/or in response to particular events.

Figure 5:
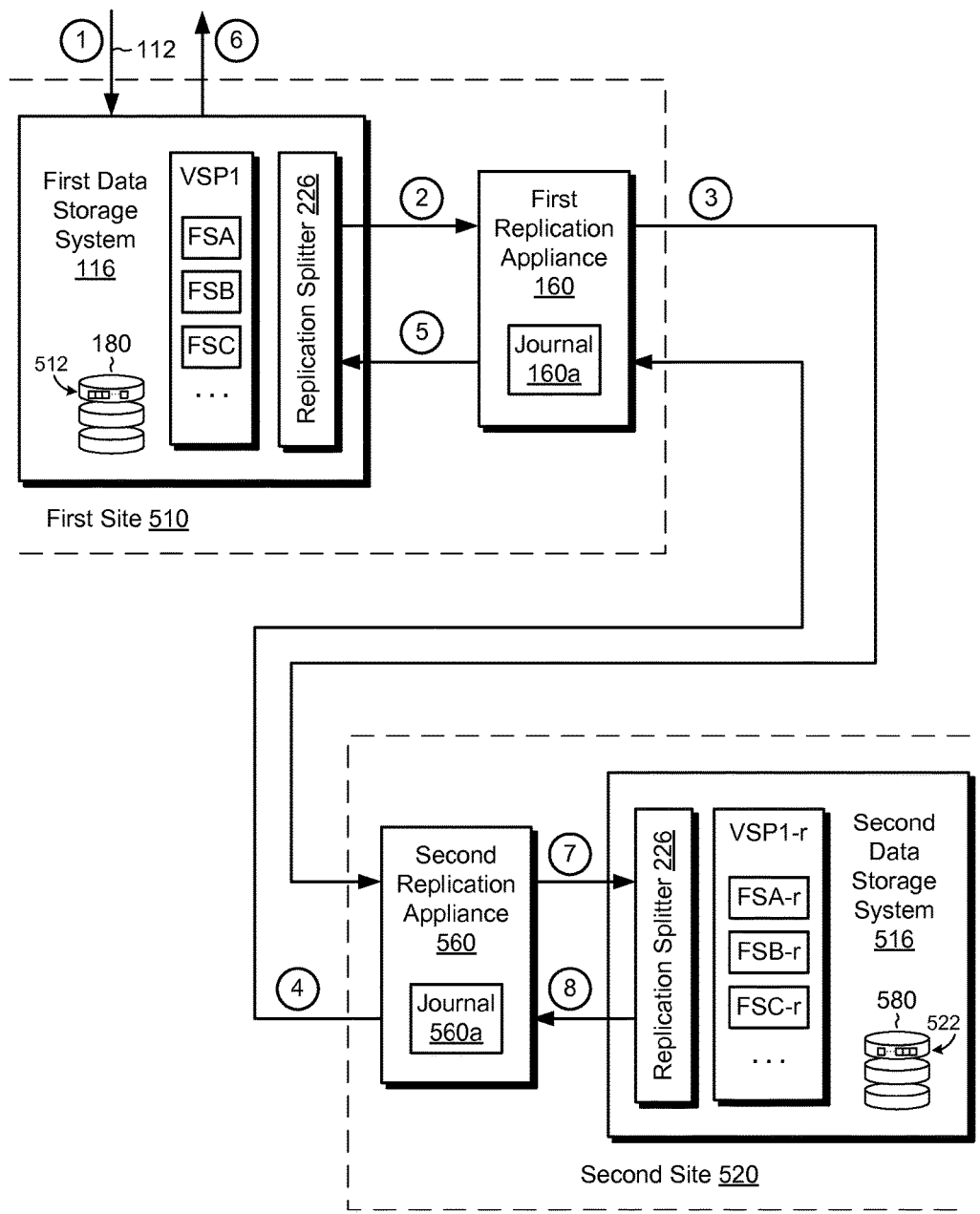
FIG. 5 is a block diagram showing an example arrangement for performing continuous replication of a VSP between a first data storage system at a first site and a second data storage system at a second site.

FIG. 5 shows an example arrangement for performing continuous replication on a VSP (VSP1) stored on a first data storage system 116 (i.e., the data storage system 116 of FIG. 1) to replicate the VSP to a second data storage system 516. Here, the first data storage system 116 is located at a first site 510 (i.e., at a "source") and the second data storage system 516 is located at a second site 520 (i.e., at a "destination"). In an example, the first site 510 and the second site 520 are located at different geographical locations, such as in different rooms or in different buildings of a city or campus, although this is not required. As described in connection with FIG. 1, the first data storage system 116 includes persistent storage 180 and is operatively connected to a first replication appliance 160. Here, the second data storage system 516 includes persistent storage 580 (e.g., disk drives, flash drives, and the like) and is operatively connected to a second replication appliance 560. The second replication appliance 560 includes a journal 560a, which may be implemented in non-volatile memory (e.g., on disk or flash). In some examples, the journal 560a is implemented with high-speed, non-volatile memory within the storage 580, e.g., in a LUN. In some examples the data storage systems 116 and 516 behave symmetrically, with each site acting as a replica site for data objects stored on the other. In the example shown, however, the first site 410 acts to receive and process IO requests 112 from hosts for accessing VSP1, whereas the second site 520 acts to maintain a replica VSP1-r of VSP1. The second data storage system 516 may be configured in a manner similar or identical to the first data storage system 116. For example, although not shown, the second data storage system 516 includes its own communication interface(s) 122, processing units 124, memory 130, IO stack 140, replication manager 162, and GUI application 164. The replication managers 162 and GUI application 164 may coordinate across the two systems to manage and orchestrate replication, failover, DR testing, and recovery.

It can be seen that VSP1 includes at least three file systems, labeled FSA, FSB, and FSC. Continuous replication maintains a replica VSP1-r of VSP1 at the second data storage system 516. The replica VSP1-r includes replicas of each of VSP1's file systems, i.e., replicas FSA-r, FSB-r, and FSC-r, which are replicas of FSA, FSB, and FSC, respectively.

To replicate VSP1 as a single object, the replication manager 162 (FIG. 1) may assign all of the file systems of VSP1 (e.g., FSA, FSB, and FSC) to the same consistency group. In an example, the replication manager 162 groups together the volume-files (FIG. 3) for VSP1's data objects (e.g., FSA, FSB, and FSC) into a single volume structure (the consistency group) and performs continuous replication consistently across all volume-files in the group.

The encircled numbers in FIG. 5 identify an example sequence of events. In this example, synchronous replication is shown. At (1), the first data storage system 116 receives an IO request 112 specifying data to be written in the storage 180 for a particular file system in VSP1 (e.g., any of FSA, FSB, or FSC). The IO request 112 propagates down the IO stack 140 (FIG. 2) and encounters the replication splitter 226. The replication splitter 226 intercepts the IO request and temporarily prevents the IO request from propagating further down the IO stack 140.

At (2), the replication splitter 226 sends the IO request (e.g., a version thereof) to the first replication appliance 160. The first replication appliance 160 may store the JO request in the journal 160*a*.

At (3), the first replication appliance 160 forwards the IO request to the second replication appliance 560. The second replication appliance 560 stores the data specified in the IO request in the journal 560*a*.

At (4), the second replication appliance 560 acknowledges safe storage of the data specified in the IO request back to the first replication appliance 160. For example, the second replication appliance 560 acknowledges that the data specified in the IO request have been persisted in the journal 560*a*.

At (5), the first replication appliance 160 in turn acknowledges receipt to the replication splitter 226. Only when the replication splitter 226 receives the acknowledgement from the first replication appliance 160 does the replication splitter 226 allow the IO request to continue propagating down the IO stack 140 (FIG. 2). The replication splitter 226 receives the acknowledgement and completes the write operation specified in the IO request to the storage 180, e.g., to blocks 512 to which the IO request was directed.

At (6), the first data storage system 116 acknowledges completion of the IO request 112 back to the originating host.

Asynchronously with the IO request, the second replication appliance 560 may de-stage data from the journal 560*a* to the replica 522 of VSP1 maintained in the storage 580. For example, at (7), the data specified in the IO request are transferred from the journal 560*a* to the storage 580, e.g., to blocks 522 storing replica data. At (8), the second data storage system 516 acknowledges completion.

The arrangement shown in FIG. 5 may be used with slight modification to perform asynchronous replication. For instance, the first replication appliance 160 may be configured to provide acknowledgements as soon as it persists the specified data locally, e.g., in the journal 160*a*. The first replication appliance 160 accumulates data from the replication splitter 226 and sends the data to the second site 520 on a regular basis and/or upon the occurrence of specified events, e.g., in accordance with settings prescribed in by for VSP1 in the replication manager 162. Thus, the arrangement of FIG. 5 supports both synchronous and asynchronous continuous replication. Additional information about synchronous and asynchronous continuous replication of VSPs and the objects they contain may be found in U.S. patent application Ser. No. 14/041,204, filed Sep. 13, 2013, the contents and teachings of which are incorporated by reference as if set forth explicitly herein.

III) Example Improvements for Performing Point-In-Time Recovery of File System and VSP Replicas:

Techniques will now be described in connection with FIGS. 6-11 for performing point-in-time recovery of file systems and VSPs. These techniques may be performed, for example, in the environment 100 of Section I using the continuous replication processes described in Section II.

Figure 6:
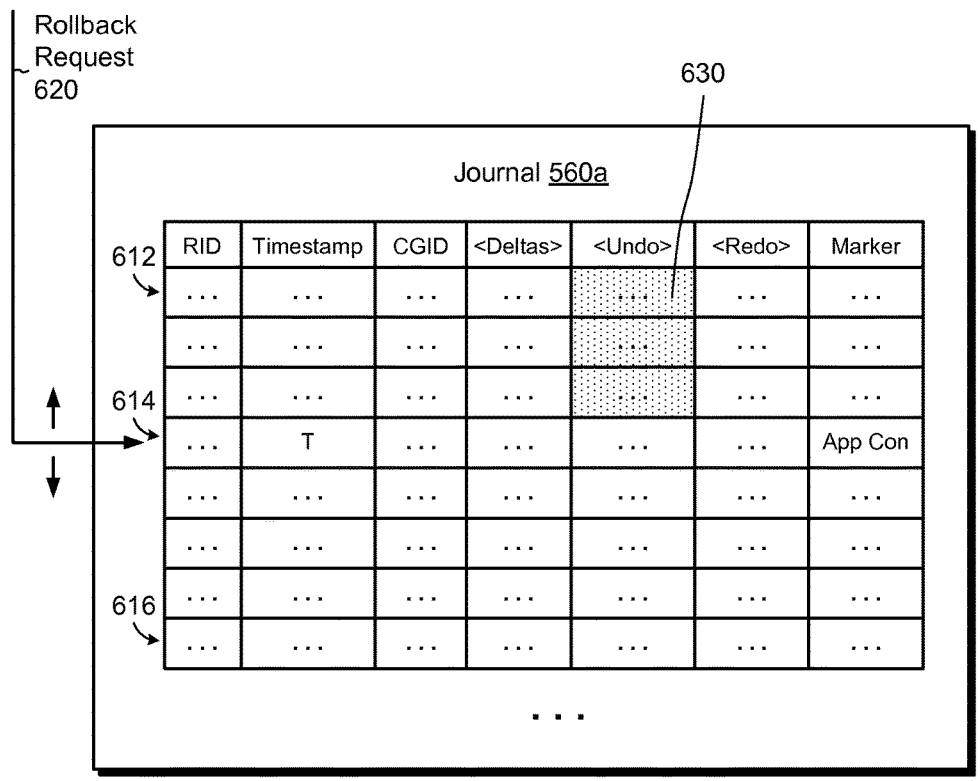
FIG. 6 is a block diagram showing example contents of a journal used in performing continuous replication and point-in-time recovery.

FIG. 6 shows an example realization of portions of the journal 560*a*. The journal 560*a* organizes information to assist with continuous replication and to enable point-in-time recovery. In this example, the journal 560*a* organizes information in records by record ID (RID), shown as rows, where each record corresponds to a single replication operation. Each replication operation may include one or more IO requests 112 received by the first data storage system 116 and mirrored to the second data storage system 516. FIG. 6 shows several records in reverse chronological order, ranging from a most recent record 612 to an older record 616. In an example, the journal 560*a* persists a very large number of records, corresponding to a very large number of replication operations. In some examples, the RID is an auto-incrementing number. In other examples, a timestamp or some other unique value may serve as the RID.

As shown, the journal 560*a* stores, for each record listed, a timestamp, an identifier of the consistency group (CGID) to which the respective replication operation is directed, and a set of changes <Deltas> applied to the replica of the respective consistency group, e.g., performed on the consistency group at the source and mirrored to the destination. For example, these changes include a list of block locations and associated values to be applied to the identified consistency group by the respective replication operation. If the consistency group represents a single file system (e.g., FSA), then the set of changes indicates changes made to the volume-file for that file system. If the consistency group represents a VSP, then the set of changes identifies changes made to any of the volume-files grouped together by the VSP. In all cases, the changes (deltas) provide data for mirroring changes made to a data object in the first data storage system 116 to a replica in the second data storage system 516.

The journal 560*a* can further be seen to include, for each RID, undo information <Undo> and redo information <Redo>. The undo information for a given replication operation includes changes (e.g., block locations, modifications, etc.) required to reverse, or "undo," any changes (Deltas) made to a consistency group as a result of having performed that replication operation. For example, the undo information may include block locations and values of a replica where changes (deltas) were applied. Thus, applying the undo information for a particular replication operation has the effect of nullifying the changes (deltas) made by applying that replication operation to the consistency group and thus of restoring the consistency group to its previous state. The redo information for a particular replication operation has the effect of reversing the effect of having applied the undo information. In some examples, the redo information for a particular replication operation is similar or identical to the deltas.

In some examples, the journal 560*a* may associate any of the records with a respective "marker." For instance, an administrator or other user of the first data storage system 116 may insert a marker into an ongoing replication session, e.g., by operating the GUI application 164, to mark a particular point in time. Alternatively, an application running on a host may insert a marker automatically. In either case, the replication manager 162 applies that marker to the next replication operation, e.g., as metadata with the next mirrored IO request, such that the marker travels from the first data storage system 116 to the second data storage system 516 at a known point in time. In the example of FIG. 6, a marker named "App Con" has been inserted as metadata and recorded in the journal 560*a* with record 614.

To perform point-in-time recovery for a particular data object, an administrator may operate the GUI application 164 to view selected content of the journal 560*a* and to select a point in time to which to roll back. For example, the GUI application 164 may receive input from the administrator and generate, in response to the input, a rollback request 620. Here, the rollback request 620 identifies, based on the administrator's selection, the record 614, which corresponds to a previous point in time, shown as "T." It should be understood, though, that the rollback request 620 may specify any point in time, i.e., any of the records for that data object listed in the journal 560*a*. In some examples, rollback granularity may be provided down to the level of individual IO requests.

In response to receiving the rollback request 620, the replication manager 162 orchestrates recovery of the replica of the selected data object to the designated point in time. For example, the replication manager 162 directs recovery activities to apply changes specified in the undo information 630 for the data object that have accrued since the time T. In an example, the recovery activities apply undo information to the selected data object in reverse-chronological order, undoing the most recent change first and continuing in order until all changes have been undone back to the time T. Although the journal 560*a* is shown to include records for multiple objects (CGIDs), it should be understood that undo information is applied only for the selected data object, i.e., the data object that the administrator has chosen to roll back.

Given this framework, it is clear that the administrator may also roll forward in time, e.g. by providing input to the GUI application 164, to select a more recent point in time, including the most recent point in time. To roll forward, replication activities apply redo information for the designated data object to apply changes, e.g., in forward-chronological order, beginning from the currently selected point in time and proceeding, in order, to the newly selected point in time.

In some examples, an application running on one or more of the hosts 110(1-N) (FIG. 1) may have activities in flight that must run to completion before the application can assume a consistent and/or recoverable state. For instance, the application may internally queue IO requests and/or may perform processing to form IO requests to complete some activity. If an error occurs in the first data storage system 116 while these activities are in process, the application might not be able to recover easily from the error and proceed. To provide the option to avoid recovering from a replica that reflects an inconsistent state of the application, an administrator may temporarily quiesce the application to allow the application to assume a consistent state, and then manually insert a marker, such as "App Con" (FIG. 6). The administrator may then resume the application. The marker communicates the application-consistent state information to the journal 560*a* in the next replication operation. Later, if a file system, VSP, or other object experiences an error such that recovery is required, it might be better to roll back the replica to a point in time when the application was in the consistent state. It should be understood that rollback to an application-consistent point in time is not required, however. For instance, it may be preferable to recover from a more recent point in time, e.g., to avoid data loss, even if doing so comes at the cost of having to repair or reset the application.

Figure 7:
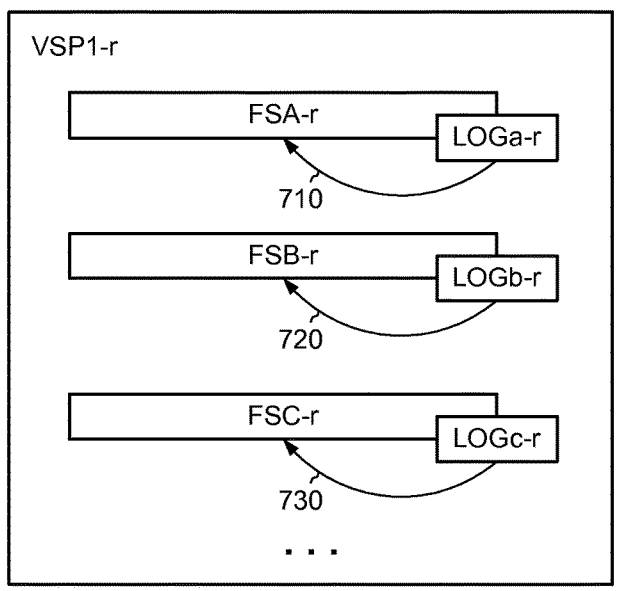
FIG. 7 is a block diagram showing an example of pending metadata changes in transaction logs being synced to respective file systems of a VSP when performing point-in-time recovery.

FIG. 7 shows example activities that may be performed when restoring a VSP to a previous point in time. The activities described may be applied to file systems individually, as well. In this example, VSP1-*r*, on the second data storage system 516, provides a replica of VSP1, on the first data storage system 116 (FIG. 5). VSP1-*r* groups together file systems FSA-r, FSB-r, and FSC-r, which respectively provide replicas of file systems FSA, FSB, and FSC. In this example, each of the file system replicas FSA-r, FSB-r, and FSC-r has an associated transaction log, identified here as LOGa-r, LOGb-r, and LOGc-r, respectively. These transaction logs LOGa-r, LOGb-r, and LOGc-r themselves are replicas of transaction logs provided for file systems FSA, FSB, and FSC, respectively, in the first data storage system 116. Each transaction log stores pending metadata transactions that are yet to be applied to its respective file system. The metadata transactions may describe, for example, updates to inodes, indirect blocks, or other metadata structures in the file system. In an example, each transaction log is replicated along with its respective file system. For instance, a transaction log may be implemented in a separate file (e.g., an auxiliary file), and the separate file may be assigned to a consistency group along with the volume-file that realizes the file system to which the transaction log belongs (FIG. 3). Alternatively, the transaction log may itself be embedded within the file system to which it belongs, e.g., in a dedicated file system subspace, such that replicating the file system inherently replicates the transaction log. Other types of transaction logs may be used; these are merely examples. In any case, restoring a file system to a particular point in time may involve also restoring the transaction log for that file system to the same point in time. When restoring a VSP to a previous point in time, the file systems grouped by the VSP are all restored to the same point in time, along with their respective transaction logs.

When restoring a file system replica to a previous point in time, the file system replica may be left in an incomplete state, which reflects an incomplete state of the source file system. The state of the file system and the replica may be incomplete because pending metadata transactions from the transaction log have not yet been applied to the file system. Thus, when rolling back a file system to a previous point in time, restore activities may include applying the pending transactions from the transaction log to the metadata structures in the file system.

As shown in FIG. 7, restore activities 710 apply pending log transactions from LOGa-r to FSA-r, e.g., by writing the pending transactions to the metadata structures in FSA-r. Similarly, restore activities 720 and 730 apply pending log transactions to file systems FSB-r and FSC-r, respectively. At the conclusion of operations 710, 720, and 730, the file systems grouped by VSP1-*r* are each in a complete, consistent state and are available for user access.

It should be understood that applying log transactions to file systems involves making changes to the file systems. In some examples, such changes are provided in the form of IO requests that are processed by the IO stack 140 of the second data storage system 516. A replication splitter 226, within the IO stack of the second data storage system 516, may intercept each of the IO requests en route to the storage 580 and forward the IO request to the journal 560*a*. The journal 560*a* may then record data specified by the IO requests in applying transactions from a transaction log, with such data forming one or more new records in the journal (new deltas). Associated undo and redo information may be provided, such that writes from the log may be undone or redone as desired.

Figure 8A:
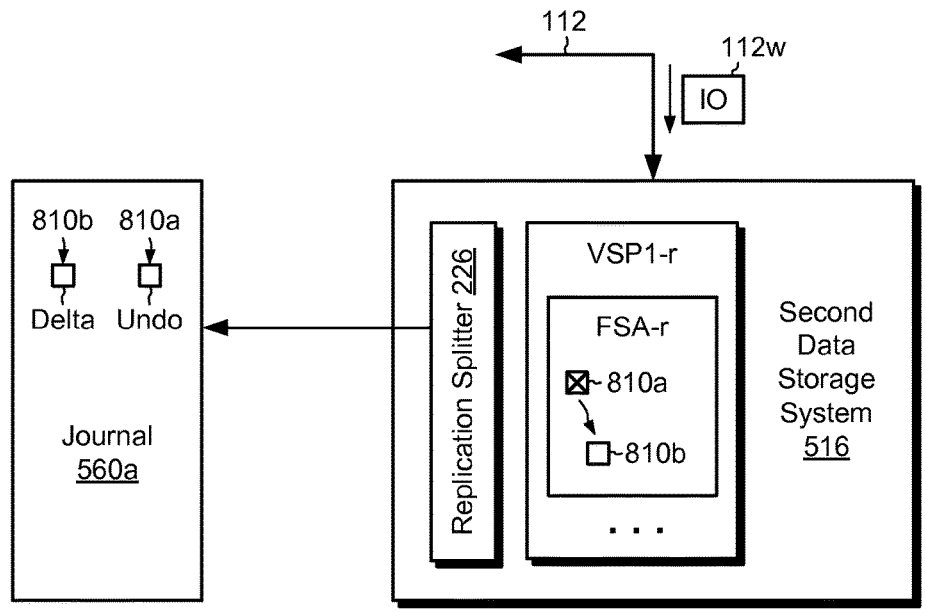
FIGS. 8A and 8B show an example technique for handling data writes to a VSP during DR testing to allow the writes to be undone.
Figure 8B:
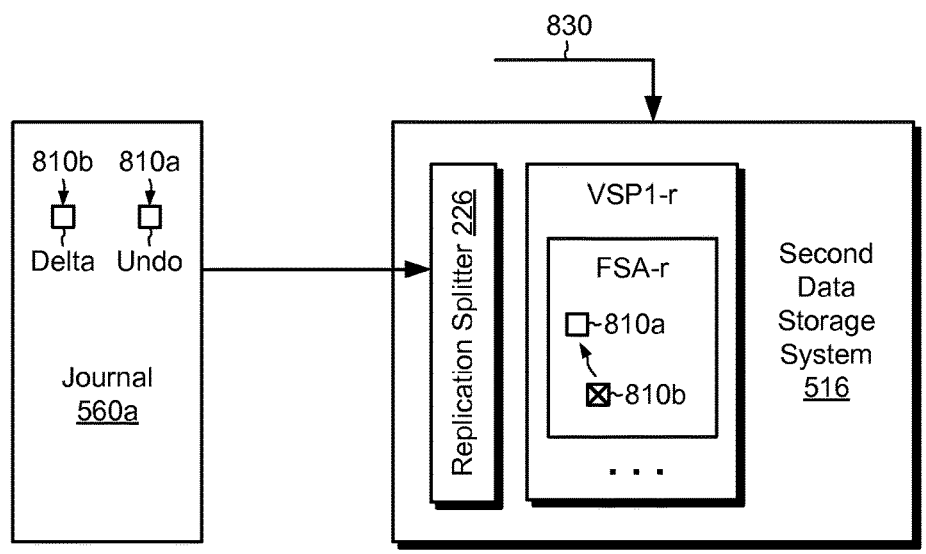

FIGS. 8A and 8B show example operations when performing DR (Disaster Recovery) testing on a VSP. The operations described may be applied to file systems individually, as well.

In FIG. 8A, it is assumed that VSP1-r has been restored to a previous point in time, e.g., in response to a rollback request 620 in the manner described in connection with FIGS. 6 and 7, and that an administrator or other user has entered a DR testing mode. Here, the second data storage system 516 receives IO requests 112, e.g., from the administrator, to exercise VSP1-r, e.g., to perform reads and writes, in an effort to ascertain whether VSP1-r could take over for VSP1 in the event of a failure at the first data storage system 116.

In contrast with previous approaches to DR testing, which involve taking snaps of a volume and then reading and writing the snaps to assess the state of the replicated object, DR testing in this example is performed directly on the rolled-back replica, rather than on a snap. It is believed that performing DR testing on the rolled-back replica itself provides more accurate DR testing results, as one is exercising the very same object to which failover would occur through the very same data path, e.g., not through other metadata structures as would be the case with a snap.

In an example, the administrator issues an IO request 112w specifying data to be written to a set of blocks of FSA-r (one block shown). Prior to processing the IO request 112w, the value of the addressed block is 810a. After processing the IO request 112w, the value of the same block will be 810b. When processing the IO request 112w in the IO stack 140, the replication splitter 226 intercepts the IO request 112w, reads the current value of the addressed block from FSA-r, and stores the current value 810a in a new record in the journal 560a, i.e., as undo information. Once the data 810a are persisted in the journal 560a as undo information, the replication splitter 226 may allow the IO request 112w to write the data 810b to the addressed block of FSA-r (FIG. 5). DR testing may proceed in this fashion, with every write to any object in VSP1-r causing the journal 560a to preserve the change in a new record along with associated undo information.

In FIG. 8B, a command 830 is received to exit DR testing mode. In response to the command 830, the replication manager 152 orchestrates actions to restore VSP1-r to a current state, i.e., a state that reflects the current or nearly current state of VSP1. Alternatively, activities may restore VSP1-r to some other point in time. Here, restore activities access the journal 560a and perform undo operations to reverse the changes applied to VSP1-r during DR testing. Restore activities include changing the value of the illustrated block from 810b back to 810a, as well as making similar changes to other blocks changed during DR testing. Restore activities may further include undoing changes in the file systems FSA-r, FSB-r, and FSC-r that resulted from applying log transactions.

Figure 9:
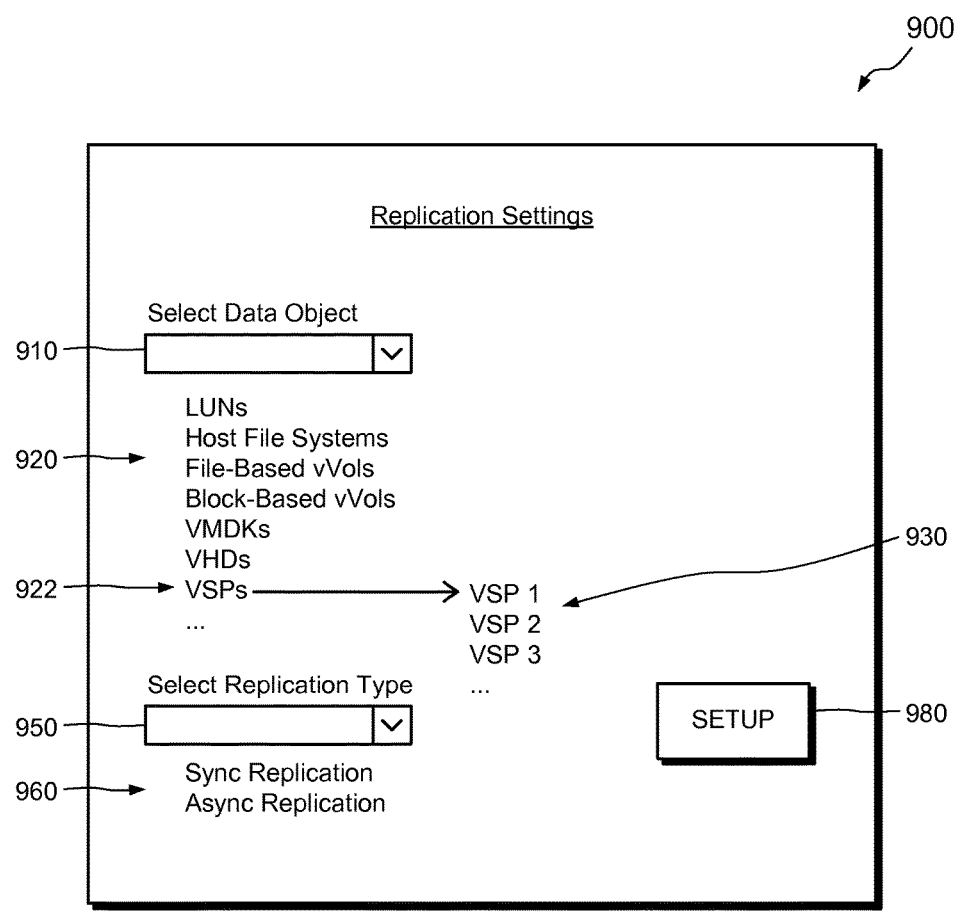
FIG. 9 is a screen shot showing an example screen generated by a graphical user interface (GUI) application for establishing replication settings of data objects on a per-user-object basis and for managing life cycles of user objects.
Figure 10:
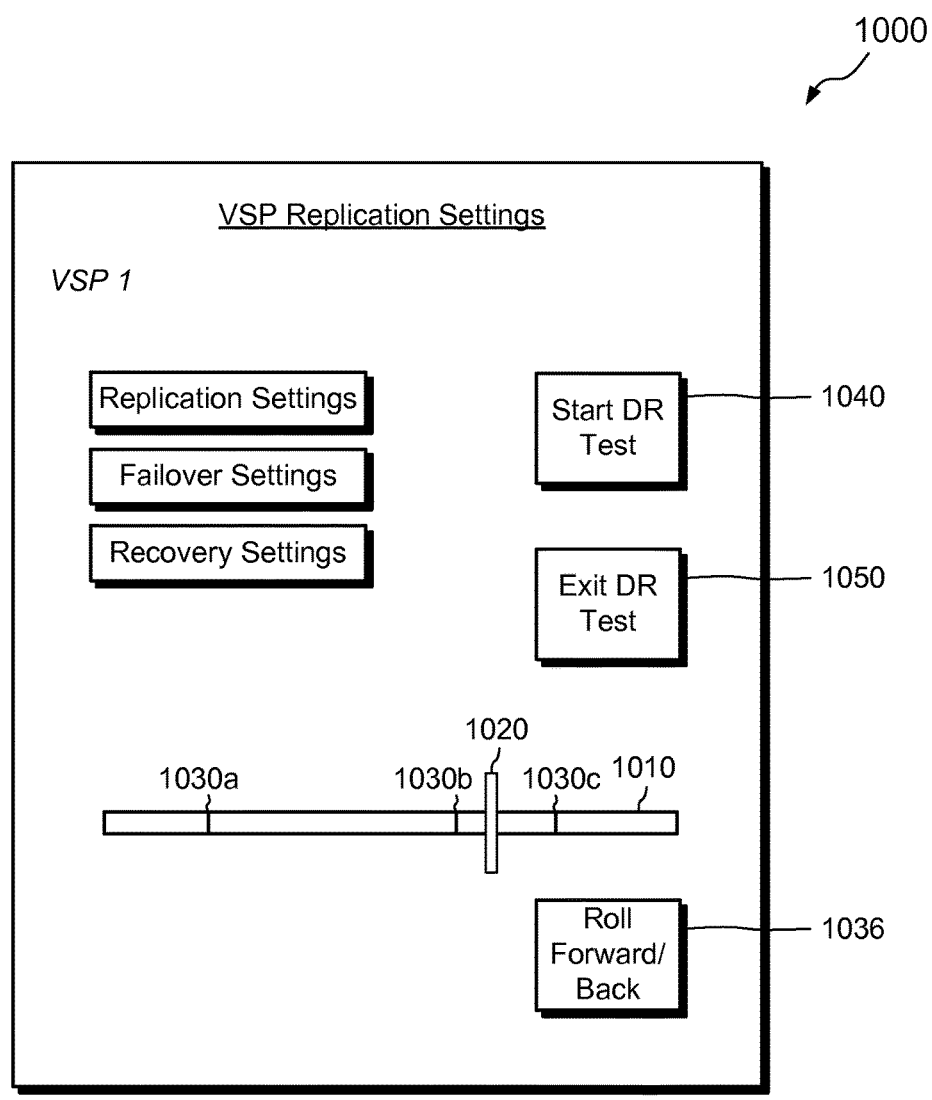
FIG. 10 is a screen shot showing another example screen generated by the graphical user interface (GUI) application for establishing replication settings for a VSP, for rolling back to a previous point in time, and for entering and exiting a DR testing mode.

FIGS. 9 and 10 show examples screen shots generated by the GUI application 164. In an example, the GUI application 164 provides a single tool for managing data objects throughout their lifecycles. Thus, for example, an administrator may operate the GUI application 164 to create or destroy data objects, to establish replication, failover, and recovery settings, and to perform DR testing. It should be understood that the particular controls and features shown in FIGS. 9 and 10 may be implemented in many alternative ways, and that the examples shown are intended to be merely illustrative.

For instance, as shown in FIG. 9, an example screen 900 has a control 910 for selecting a data object. When the user clicks on the indicated arrow, the GUI application 164 displays a list 920 of data object types. If the user then clicks one of the displayed object types, such as VSPs 922, the GUI application 164 displays a list 930 of particular VSPs. The administrator may select one of the VSPs. For example, the administrator may select VSP1 and operate control 950 to select a replication type 960 (e.g., Sync or Async). The administrator may then click a setup button 980. It should be understood that the administrator may alternatively select a file system or some other object type to configure. The operations described herein may work in similar ways, regardless of the type of object selected.

FIG. 10 shows an example screen 1000, which the GUI application 164 may display in response to the setup button 980 being clicked (FIG. 9). Here, the administrator may specify settings for VSP1. These may include settings for replication, failover, and recovery, as shown in buttons to the left (clicking them may open new screens). They also include a button 1040 to start a DR test, a button 1050 to exit a DR test, and a slider 1010 to roll VSP1 back in time. For example, the administrator may move bar 1020 left or right to identify a desired point in time to which to roll back VSP1. Moving the bar 1020 causes an internal cursor to move relative to the journal 560a (FIG. 5), such that moving the bar 1020 to the left moves an internal cursor down, to older records, while moving the bar to the right moves the internal cursor up, to more recent records. Marked locations 1030a, 1030b, and 1030c indicate application-consistent markers, such as the "App Con" marker shown in FIG. 6. The user thus has the option to roll back to an application-consistent point in time if the user so chooses. With the bar 1020 set to the desired point in time, the user may click the button 1036 to roll back, whereupon the GUI application 164 directs the replication manager 162 to orchestrate activities to roll back VSP1-r to the identified point in time, i.e., in the manner described in connection with FIGS. 6 and 7. If the user wishes, the user may then click button 1040 to start DR testing on VSP1-r, e.g., in the manner described in connection with FIG. 8A. When the user is finished, the user may click the button 1050 to exit DR testing. In response, the GUI application 164 directs the replication manager 162 to orchestrate activities to undo changes made to VSP1-r during the DR testing, e.g., in the manner described in connection with FIG. 8B. These changes may include undoing log transactions applied to the file systems FSA-r, FSB-r, and/or FSC-r.

Figure 11:
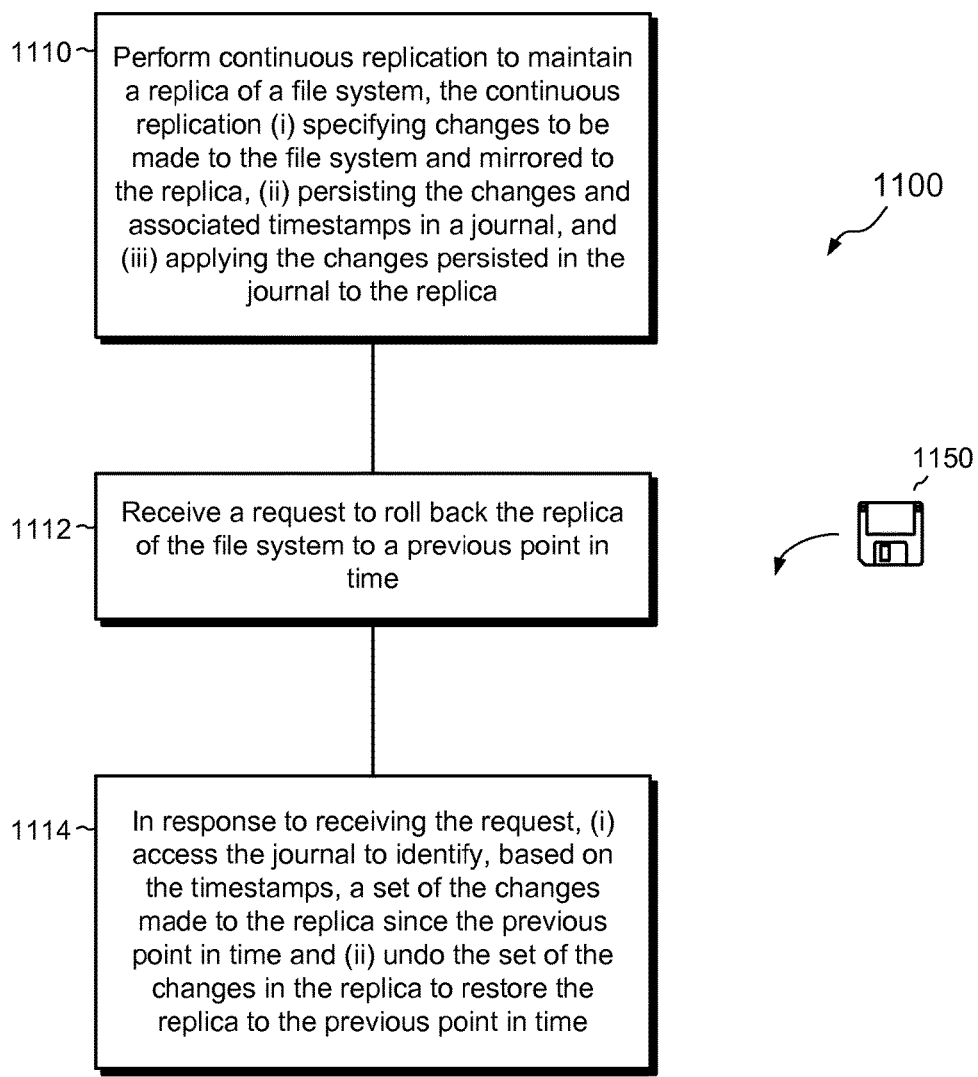
FIG. 11 is a flowchart showing an example method for managing file system replicas in a data storage system.

FIG. 11 shows an example process 1100 for managing file system replicas in a data storage system and provides a summary of some of the operations described above. The process 1100 may be carried out, for example, by the second data storage system 516, which may act in cooperation with the first data storage system 116 to perform continuous replication on a file system or VSP. The second data storage system 516 may perform acts of the process 1100 by the set of processing units 124 executing instructions in the memory 130 of the second data storage system.

At 1110, continuous replication is performed to maintain a replica of a file system. The continuous replication (i) specifies changes to be made to the file system and mirrored to the replica, (ii) persists the changes and associated timestamps in a journal, and (iii) applies the changes persisted in the journal to the replica. For example, the second data storage system 516 performs continuous replication, in coordination with activities at the first data storage system 116, to maintain a replica (e.g., FSA-r) of a file system (e.g., FSA). The continuous replication provides IO requests 112 specifying data to be written to FSA to the replica, FSA-r, persists the data specified in the IO requests in a journal 560a (e.g., in "deltas") with associated timestamps (FIG. 6), and applies the changes from the journal 560a to the replica FSA-r (FIG. 5).

At 1112, a request is received to roll back the replica of the file system to a previous point in time. For example, an administrator or other user may adjust the bar 1020 on slider 1010 (FIG. 10) to identify a desired previous point in time and may click the button 1036 to initiate rollback.

At 1114, in response to receiving the request, (i) the journal is accessed to identify, based on the timestamps, a set of the changes made to the replica since the previous point in time and (ii) the set of the changes in the replica is undone to restore the replica to the previous point in time. For example, clicking the button 1036 initiates a sequence of activities, as described in connection with FIGS. 6 and 7, which identify records in the journal 560a that have accrued since the indicated point in time and perform undo operations to undo the changes and restore the replica to the indicated point in time.

These activities may be performed on a single file system, on multiple file systems, or on a VSP. The VSP may group together multiple file systems and/or other data objects. Thus, the benefits of continuous replication and point-in-time recovery are extended to include file systems, and the functionality for file systems is extended to include VSPs. The improved technique thus provides flexible recovery options for file systems and VSPs and provides an effective vehicle for performing DR testing on the actual object or objects that may be relied upon in the event of failover.

Having described certain embodiments, numerous alternative embodiments or variations can be made. For example, although continuous replication is shown and described between a first data storage system 116 and a second data storage system 516, continuous replication may also be performed by a single data storage system, e.g., for providing a local target from which to perform recovery.

Also, although embodiments have been described for performing continuous replication with the aid of replication appliances 160 and 560 and replication splitters 226, this is merely an example, as the improvements hereof may be realized with any continuous replication technology.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 1150 in FIG. 11). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing file system replicas in a data storage system, the method comprising:

performing continuous replication to maintain a replica of a file system, the continuous replication (i) specifying changes to be made to the file system and mirrored to the replica, (ii) persisting the changes and associated timestamps in a journal, and (iii) applying the changes persisted in the journal to the replica;

receiving a request to roll back the replica of the file system to a previous point in time; and in response to receiving the request, (i) accessing the journal to identify, based on the timestamps, a set of the changes made to the replica since the previous point in time and (ii) undoing the set of the changes in the replica to restore the replica to the previous point in time, wherein the method further comprises:

realizing the replica of the file system in a container file stored in a container file system of the data storage system; and exposing the container file as a volume of the data storage system, wherein, when applying the changes persisted in the journal to the replica, the method includes applying the changes persisted in the journal to the volume, and wherein, when performing continuous replication to maintain the replica of the file system, the method further comprises:

performing continuous replication on a transaction log of the file system to maintain a log replica, the log replica storing pending metadata transactions to the file system; and after restoring the replica of the file system to the previous point in time, applying the pending metadata transactions from the log replica to the replica of the file system, wherein the file system is one of multiple file systems grouped together in a VSP (Virtualized Storage Processor), wherein, when performing continuous replication to maintain the replica of the file system, the method comprises performing continuous replication on each of the multiple file systems to maintain a replica of the VSP, and wherein the method further comprises managing multiple lifecycle events of the VSP, including DR testing, from a single management application.

2. The method of claim 1, further comprising, after restoring the replica of the file system to the previous point in time, processing IO requests directed to the replica of the file system to effect read and write operations on the replica as part of performing DR (Disaster Recovery) testing.

3. The method of claim 2, wherein processing the IO requests includes processing an IO request to effect a write operation that overwrites a set of blocks in the replica of the file system, and wherein, to effect the write operation, the method further includes, prior to overwriting the set of blocks, providing data from the set of blocks in the journal to preserve values of the set of blocks in the journal.

4. The method of claim 3, wherein the method further comprises:
receiving a request to exit DR testing;
in response to receiving the request to exit DR testing, copying the data provided in the journal from the set of blocks back to the set of blocks to restore the set of blocks to their state prior to processing the IO request.

5. The method of claim 3,
wherein the file system is one of multiple data objects grouped together in a VSP (Virtualized Storage Processor),
wherein, when performing continuous replication to maintain the replica of the file system, the method comprises performing continuous replication on each of the multiple data objects to maintain a replica of the VSP,
and wherein performing DR testing on the replica of the file system is part of a process for performing DR testing on the VSP.

6. The method of claim 5, wherein the multiple data objects grouped together in the VSP include the file system as well a set of other objects, the set of other objects including at least one of (i) another file system, (ii) a LUN (Logical Unit Number), or (iii) a VVol (Virtual Volume), and wherein the replica of the VSP includes a replica of each of the set of other objects.

7. The method of claim 1, wherein performing continuous replication includes performing discrete update operations on the replica of VSP keep the replica of the VSP current with changes made to the VSP, and wherein the method further comprises:
receiving a message in one of the discrete update operations that identifies a point in time at which an application accessing the VSP is in an application-consistent state,
wherein the request to roll back the replica to the previous point in time is a request to roll back the replica to the point in time at which the application accessing the VSP was in the application-consistent state.

8. A data storage system comprising control circuitry constructed and arranged to:
perform continuous replication to maintain a replica of a file system, the continuous replication (i) specifying changes to be made to the file system and mirrored to the replica, (ii) persisting the changes and associated timestamps in a journal, and (iii) applying the changes persisted in the journal to the replica;
receive a request to roll back the replica of the file system to a previous point in time; and
in response to receiving the request, (i) access the journal to identify, based on the timestamps, a set of the changes made to the replica since the previous point in time and (ii) undoing the set of the changes in the replica to restore the replica to the previous point in time,
wherein the control circuitry, constructed and arranged to perform continuous replication to maintain the replica of the file system, is further constructed and arranged to:
perform continuous replication on a transaction log of the file system to maintain a log replica, the log replica storing pending metadata transactions to the file system; and
after restoring the replica of the file system to the previous point in time, apply the pending metadata transactions from the log replica to the replica of the file system,
wherein the file system is one of multiple file systems grouped together in a VSP (Virtualized Storage Processor), wherein, when constructed and arranged to perform continuous replication to maintain the replica of the file system, the control circuitry is further constructed and arranged to perform continuous replication on each of the multiple file systems to maintain a replica of the VSP, and wherein the control circuitry is further constructed and arranged to manage multiple lifecycle events of the VSP, including DR testing, from a single management application.

9. The data storage system of claim 8, wherein the control circuitry is further constructed and arranged to:
realize the replica of the file system in a container file stored in a container file system of the data storage system; and
expose the container file as a volume of the data storage system,
wherein, when constructed and arranged to apply the changes persisted in the journal to the replica, the control circuitry is further constructed and arranged to apply the changes persisted in the journal to the volume.

10. A computer program product including a set of non-transitory, computer-readable media having instructions which, when executed by control circuitry, cause the control circuitry to perform a method of managing replicas, the method comprising:
performing continuous replication to maintain a replica of a VSP (Virtualized Storage Processor), the VSP including multiple file systems, the continuous replication (i) specifying changes to be made to the VSP and mirrored to the replica, (ii) persisting the changes and associated timestamps in a journal, and (iii) applying the changes persisted in the journal to the replica;
receiving a request to roll back the replica of the VSP, including each of the multiple file systems, to a previous point in time; and
in response to receiving the request, (i) accessing the journal to identify, based on the timestamps, a set of the changes made to the replica of the VSP since the previous point in time and (ii) undoing the set of the changes in the replica of the VSP to restore the replica to the previous point in time, wherein, when performing continuous replication to maintain the replica of the file system, the method further comprises:
- performing continuous replication on a transaction log of the file system to maintain a log replica, the log replica storing pending metadata transactions to the file system; and
- after restoring the replica of the file system to the previous point in time, applying the pending metadata transactions from the log replica to the replica of the file system, wherein the file system is one of multiple file systems grouped together in a VSP (Virtualized Storage Processor), wherein, when performing continuous replication to maintain the replica of the file system, the method comprises performing continuous replication on each of the multiple file systems to maintain a replica of the VSP, and wherein the method further comprises managing multiple lifecycle events of the VSP, including DR testing, from a single management application.

11. The computer program product of claim 10, wherein the replica of the VSP includes a file system replica for each of the multiple file systems that the VSP includes, and wherein the method further comprises:
- realizing the file system replicas in respective container files stored in a set of container file systems of the data storage system; and
- exposing each container file as a respective volume of the data storage system,
- wherein, when applying the changes persisted in the journal to the replica, the method includes applying the changes persisted in the journal for each of the multiple file systems to the respective volume.

12. The computer program product of claim 11, further comprising, after restoring the replica of the VSP to the previous point in time, processing IO requests directed to the replica of the VSP to effect read and write operations on the replica of the VSP as part of performing DR (Disaster Recovery) testing.

13. The computer program product of claim 12, wherein processing the IO requests includes processing an IO request to effect a write operation that overwrites a set of blocks in the replica of the VSP, and wherein, to effect the write operation, the method further includes, prior to overwriting the set of blocks, providing data of the set of blocks in the journal to preserve values of the set of blocks in the journal.

14. The computer program product of claim 13, wherein the method further comprises:
- receiving a request to exit DR testing;
- in response to receiving the request to exit DR testing, copying the data provided in the journal from the set of blocks back to the set of blocks to restore the set of blocks to their state prior to processing the IO request.

15. The computer program product of claim 14, wherein the VSP further includes a set of other objects, the set of other objects including at least one of (i) a LUN (Logical Unit Number) or (ii) a VVol (Virtual Volume), wherein the replica of the VSP includes a replica of each of the set of other objects, and wherein the method further comprises:
- realizing the replica of each of the set of other objects in respective other container files stored in the set of container file system of the data storage system; and
- exposing each of the other container files as a respective volume of the data storage system,
- wherein, when applying the changes persisted in the journal to the replica, the method includes applying the changes persisted in the journal for each of the set of other objects to the respective volume.

* * * * *